Patented Apr. 24, 1951

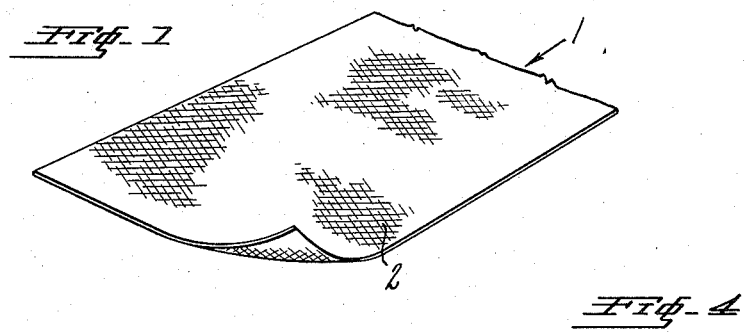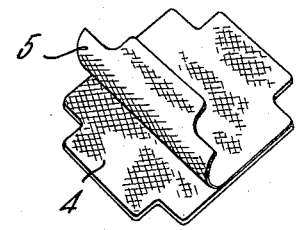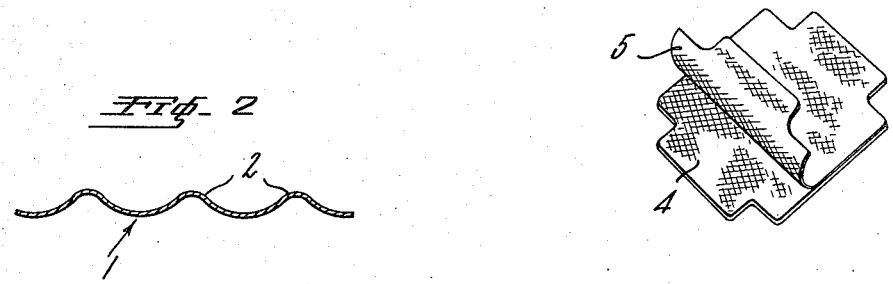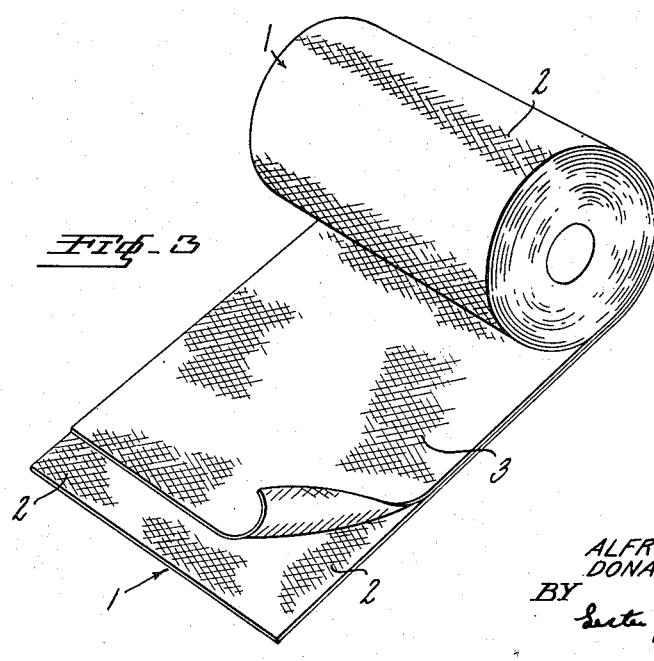

2,550,151

UNITED STATES PATENT OFFICE 2,550,151

SEPARABLE BACKING FOR REPAIR MATERIAL

Alfred N. Iknayan and Donald A. Macdonald, Indianapolis, Ind., assignors to United States Rubber Company, New York, N. Y., a corporation of New Jersey Application July 11, 1945, Serial No. 604,328

1 Claim. (Cl. 152—367)

This invention relates to an improved backing or liner for plastic sheet materials and more particularly to a separable backing or liner for plastic materials such as rubber or the like used in repairing tires.

In repairing pneumatic tires it is customary to obtain from the manufacturer certain repair materials such as tire patches, and long strips of sheet material such as tread gum, cushion gum, cord fabric and other repair materials. The patches as sold are reinforced and cut to size. The long strips of sheet material are supplied in the form of rolls. The cord fabric is reinforced with cords that are covered with the plastic material. The tread gum and cushion gum is usually sold in the form of sheet stock in the order of $\frac{1}{32}$ or $\frac{1}{16}$ of an inch thick and may be a foot or more in width and of indefinite length, so that pieces of various sizes may be cut therefrom as needed to repair pneumatic tires. These repair materials may be formed of vulcanized or unvulcanized natural rubber or synthetic rubber, and the surface of such repair material which is to be firmly bonded to the tire is made tacky and should be kept clean and free from exposure to the air from the time it is manufactured until it is used in repairing a tire.

Heretofore it has been customary to utilize a sheet of Holland cloth, cellophane or the like as a separable backing sheet adapted to cover and protect such tacky surface, and in the case of those repair materials which are sold to the customers in the form of rolls, the Holland cloth or the like serves also as a liner to separate adjacent coils of the plastic material.

The present invention contemplates an improved type of separable backing sheet or liner in the form of an embossed strong thin plastic sheet such as cellophane, cellulose acetate or the like. The embossing of this sheet may follow any preferred pattern, but particularly good results are obtained by embossing such sheet in the form of knurling of a diamond pattern with parallel lines spaced apart at a distance of approximately $\frac{3}{32}$ of an inch or less. The use of an embossed material of this description possesses a number of advantages which make it far superior to Holland cloth or similar smooth surface materials used heretofore.

By providing a backing sheet having an embossed pattern thereupon as herein contemplated, this sheet when pressed firmly against the tacky surface of the plastic repair material will cause a reversed impression of the embossed pattern to be imparted to the tacky surface of the plastic material, at least to some extent, so that the latter will retain this embossed appearance when the backing sheet is stripped therefrom. This embossed effect imparted to such tacky surface breaks up the normal smooth glossy surface of the tacky material to a sufficient degree to improve its bonding to itself and to the portion of the tire to be repaired.

Another object secured by the present invention is that the embossing of the backing sheet or liner imparts to the same a limited amount of stretch which makes it more suitable for winding into a roll with the plastic sheet, particularly when the plastic material is slightly irregular in thickness. If the backing material does not possess a limited amount of elasticity it is sometimes difficult to wind the combined plastic material and backing sheet into a cylindrical roll without causing wrinkles or distortions to be formed in the backing sheet. The embossed material contemplated by the present invention possesses that degree of resiliency which enables any unusual strain to be adjusted readily in the material. This permits uniformity and ease of operation in winding this material where it serves as a liner between adjacent coils, and its subsequent ready removal in use. Notwithstanding this elastic property the backing sheet is sufficiently rigid to impart its embossed design to the plastic material.

The embossing of the backing sheet also tends to prevent the starting of tears in the sheet and the progress of a tear in a straight line direction, and because of the uniformity of the embossed surface of the backing sheet the bond between this sheet and the tacky surface will tend to be more uniform than when a plain surface exists between these two sheets where air pockets are likely to be formed.

Still a further object secured by the present invention is that the use of an embossed backing sheet prevents smooth glossy areas from appearing on the surface of the plastic material, and causes the surface to be broken up by the formation therein of uniformly disposed ridges and depressions that are found to be highly desirable as they tend to break up into minute areas any air pockets which may be formed between the plastic material and portions of the tire to which it is bonded. Furthermore, uniformly indented gum surfaces are more adhesive or tacky than smooth surfaces.

These and other objects and advantages will appear more fully in the following detailed description when considered in connection with the accompanying drawing in which:

Fig. 1 is a perspective view of a portion of the embossed backing material of our invention;

Fig. 2 is an enlarged view, in section, of a portion of the material shown in Fig. 1;

Fig. 3 is a perspective view illustrating the relative association of the improved embossed backing sheet of our invention with a roll of gum stock; and Fig. 4 is a plan view of a tire patch having the present backing sheet partly removed therefrom.

Referring to the drawing and particularly to Fig. 1, we show an embodiment of our invention in the form of a sheet 1 having an embossed pattern 2. The sheet 1 is preferably formed of a film of thermosetting or thermoplastic material or of a synthetic resin material such as cellulose acetate or of a material generally identified as cellophane. Another example of such a material is that product which is available on the market as "Pliofilm," this being a rubber derivative in the form of a rubber hydrochloride. The liner 1 may also be formed of laminations of two or more such layers bonded together in adhered relationship. The liner 1 should be formed of a sheet which is relatively thin. The only requirement of this liner as to thickness depends upon the needs of the finished product, in that it should possess a sufficient degree of toughness to prevent tearing in the handling and removal of the liner from gum stock with which it is used. It is to be understood that the liner for this purpose is used only once and it is to be discarded after its removal from the plastic sheet. Preferably, the backing sheet or liner should have a thickness in the order of .005 inch.

The embossed pattern 2 may take the form of any conventional design of relatively small mesh. A good example of such a design is that which is illustrated and which is in the form of a diamond shaped pattern in which the parallel lines are preferably spaced apart a distance of from 1/64 to 1/8 inch. It is to be understood, however, that various other patterns or configurations may be employed and that the primary purpose of the embossing is to change the texture of the surface of the backing sheet in order to prevent the occurrence of relatively large, smooth surface areas between the backing sheet and plastic sheet.

Fig. 2 illustrates a cross sectional and enlarged view of a portion of the backing sheet shown in Fig. 1 and shows that in cross section the configuration of the embossing 2 results in numerous ridges and valleys in the surface contour of the liner. These ridges and valleys are intersected by other ridges and valleys disposed at an angle thereto as indicated by the crossing lines on the drawing to thereby form sharply defined peaks and pockets. When a material such as this is placed in contact with an uncured plastic rubber or rubber-like composition it is obvious that the embossed surface of the backing sheet will tend to break up any air pockets lying between the two surfaces and produce a more uniform bond between the plastic material 3 and backing sheet 1.

Fig. 3 illustrates the general application of the backing sheet to a continuous strip and shows it in relative position with the convolutions of the gum stock or cushion stock 3 where it serves also as a liner that separates the adjacent coils. It will be noted that because of the fact that the gum stock is rolled up in tight relationship with the liner that the embossed pattern of the liner may become impressed to some extend onto the opposite face of the gum stock that is uncovered when the stock 3 is unwound from the roll. While the sheet 1 performs the important function of providing a separating medium between convolutions of a plastic material, it also provides a very useful product in the form of an unvulcanized rubber or rubber-like material having an embossed pattern thereon that will cause this stock 3 to bond well to the tire. Fig. 4 shows a tire patch 4 of usual construction and having a tacky face which is protected from dirt and from exposure to the air by the separable backing sheet 5. This sheet 5 is embossed the same as sheet 1 in accordance with the present invention.

It is recognized that embossed patterns may be formed on unvulcanized stocks when rolled out into a sheet, but if such stocks are wound between convolutions of a plain surface liner the embossed pattern on the surface of the stock, because of the unvulcanized nature of the stock, will disappear under the leveling pressure of the plain surface of the liner. It is therefore evident that the only practical method by which an embossed pattern may be carried on the surface of a gum stock until this stock is used in repairing a tire is through the medium of an embossed backing sheet or liner which remains in contact with the stock until it is ready for use.

From the foregoing description, it is believed apparent that we have provided a novel and useful material which possesses substantial and practical advantages and, while we have shown a preferred embodiment of our invention it is to be understood that it is susceptible of those modifications which appear within the spirit of our invention and as appearing within the scope of the appended claim. The term rubber as used herein is to be construed broadly as covering natural and synthetic rubbers.

Having thus described our invention what we claim and desire to protect by Letters Patent is:

As an article of manufacture, the combination of sheet material for repairing pneumatic tires having a tacky surface of rubber-like material and a separable backing sheet, said backing being formed of a strong, thin homogeneous, air-impervious sheet of plastic resinous material not more than several thousandths of an inch thick and embossed to form a multiplicity of well defined peaks and pockets at one face and a reverse contour at the other face and the plastic sheet being slightly elastic due to its embossed properties and sufficiently rigid to cause a reverse impression of the peaks and pockets to be formed in said tacky surface and emboss such surface when these two sheets are pressed together, whereby the backing sheet is capable of stretching as the tacky surface is bent and keeps the tacky surface clean, sealed from the air and pitted so that it will bond well to a rubber object.

ALFRED N. IKNAYAN.
DONALD A. MACDONALD.

REFERENCES CITED

The following references are of record in the file of this patent:

UNITED STATES PATENTS

| Number | Name | Date |
| --- | --- | --- |
| 770,293 | Kendrick | Sept. 20, 1904 |
| 1,277,871 | Craft | Sept. 3, 1918 |
| 1,325,798 | Moomy | Dec. 23, 1919 |
| 1,543,283 | Falor et al. | June 23, 1925 |
| 1,580,428 | Fenton | Apr. 13, 1926 |
| 1,866,513 | Ballard | July 5, 1932 |
| 2,020,177 | Grove | Nov. 5, 1935 |
| 2,303,828 | Derby | Dec. 1, 1942 |
| 2,329,179 | Beh | Sept. 14, 1943 |
| 2,331,054 | Shively | Oct. 5, 1943 |

FOREIGN PATENTS

| Number | Country | Date |
| --- | --- | --- |
| 349,118 | Great Britain | May 15, 1931 |